United States Patent
Baldwin et al.

(10) Patent No.: US 10,456,715 B2
(45) Date of Patent: Oct. 29, 2019

(54) FILTER ASSEMBLY HAVING CRYOGENIC SEAL ARRANGEMENT

(71) Applicant: Caterpillar Inc., Peoria, IL (US)

(72) Inventors: Daniel Raymond Baldwin, Peoria, IL (US); David Todd Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 449 days.

(21) Appl. No.: 15/218,933

(22) Filed: Jul. 25, 2016

(65) Prior Publication Data

US 2018/0021703 A1 Jan. 25, 2018

(51) Int. Cl.
*B01D 27/08* (2006.01)
*F02M 37/22* (2019.01)
*F01M 11/03* (2006.01)
*F16J 15/16* (2006.01)

(52) U.S. Cl.
CPC ............ *B01D 27/08* (2013.01); *F01M 11/03* (2013.01); *F02M 37/22* (2013.01); *F16J 15/164* (2013.01); *B01D 2201/304* (2013.01)

(58) Field of Classification Search
CPC combination set(s) only.
See application file for complete search history.

(56) References Cited

U.S. PATENT DOCUMENTS

| 3,024,047 | A |  | 3/1962 | Schmohl |
|---|---|---|---|---|
| 3,411,812 | A |  | 11/1968 | Prince et al. |
| 3,929,358 | A |  | 12/1975 | Eckhardt |
| 4,170,556 | A | * | 10/1979 | Pall ............... B01D 29/58 210/181 |
| 4,192,519 | A |  | 3/1980 | Buggele |
| 4,849,104 | A | * | 7/1989 | Garcera ............ B01D 63/061 210/323.2 |
| 5,628,517 | A |  | 5/1997 | Jia |
| 2008/0203346 | A1 |  | 8/2008 | Shu |

* cited by examiner

*Primary Examiner* — Dirk R Bass
(74) *Attorney, Agent, or Firm* — Finnegan Henderson, Farabow, Garrett & Dunner, LLP

(57) ABSTRACT

A seal arrangement for joining a first component to a second component is disclosed. The seal arrangement may have a first sealing surface formed as an integral portion of the first component, and a second sealing surface formed as an integral portion of the second component and configured to directly engage the first sealing surface. The seal arrangement may also have an energizer engaged with the first sealing surface and configured to inhibit movement of the first sealing surface away from the second sealing surface during a temperature drop.

5 Claims, 3 Drawing Sheets

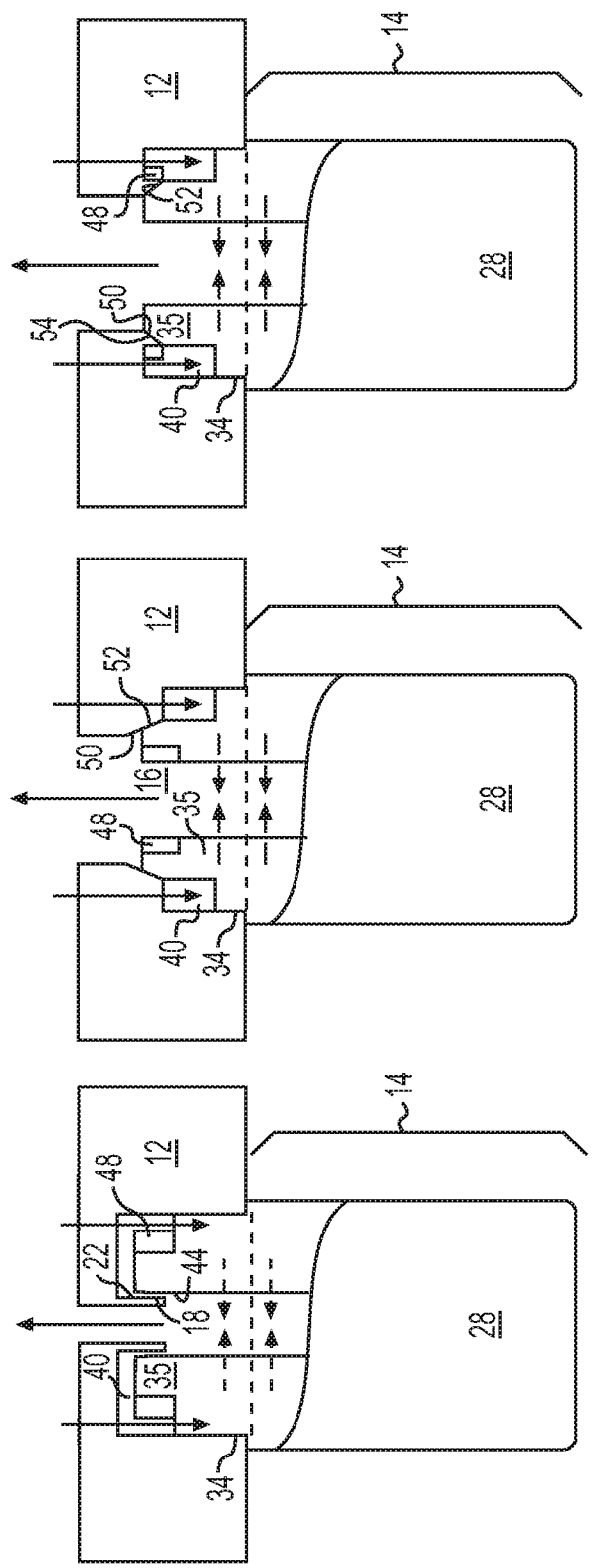

FILTER ASSEMBLY HAVING CRYOGENIC SEAL ARRANGEMENT

TECHNICAL FIELD

The present disclosure relates to a filter assembly and, more particularly, to a filter assembly having a cryogenic seal arrangement.

BACKGROUND

Filter assemblies are used in conjunction with internal combustion engines to filter debris from fluids consumed by and/or circulated through the engines. For example, filter assemblies can be used to remove particles from fuel, lubricant, coolant, or air. Typical filter assemblies include a filtration medium encapsulated within a canister. The canister is threading engaged with a base, and a seal (e.g., a spiral-wound gasket, a rubber or silicon compression seal, etc.) is located between the base and the canister. The filtration medium, canister, and seal can be periodically replaced together as a single unit.

In some applications, filter assemblies are required to operate through extreme temperature swings without leaking and/or without allowing debris to pass to critical components of the associated engines. In gaseous-fueled engines, the fuel is kept at extremely low temperatures (e.g., about −160° C.). However, when a new filtration medium, canister, and seal are installed on an engine, they may be installed at room temperature (e.g., about 20° C.). Accordingly, after installation and once cryogenic fuel begins flowing through the new filtration medium, canister, and seal, these components can experience a temperature drop of about 180° C. (or more, depending on the temperature of the filter assembly during installation). While the filter assemblies may not leak when installed at room temperature, the subsequent temperature drop can cause parts of the canister, the base, and the seal to shrink and form gaps therebetween. These gaps could allow fluid to leak from the filter assemblies and/or debris to pass into the engine.

An alternative arrangement for coupling parts together for use in extreme temperature swings is disclosed in U.S. Pat. No. 5,628,517 of Jia that issued on May 13, 1997 ("the '517 patent"). In particular, the '517 patent discloses a cryogenic seal, which utilizes differences of thermal contraction of selected dissimilar materials to self-tighten as a temperature of fluid passing therethrough decreases from ambient. The cryogenic seal includes first and second coupling members to be coupled to each other, an o-ring spacer located between the first and second coupling members, and a nut that passes over ends of the first and second coupling members and encloses the o-ring spacer. As the nut is turned, the first and second coupling members are forced to sandwich the o-ring spacer therebetween and create a fluid-tight seal at ambient temperatures. The o-ring spacer and the nut have higher coefficients of thermal contraction than the first and second coupling members. With this arrangement, as cryogenic fluid passes through the first and second coupling members, the o-ring spacer and the nut shrink, forcing the o-ring spacer tighter against the first and second coupling members.

Although the cryogenic seal of the '517 patent may serve to improve sealing between two coupling members experiencing cryogenic temperatures, it may have limited application. In particular the cryogenic seal of the '517 patent may only be used in situations where access to the nut remains available after the two components are engaged with each other. Accordingly, the cryogenic seal may not be used to connect a filter canister to a base. In addition, the cryogenic seal may not be applicable to high-vibration situations, where movement and/or abrasion of the o-ring spacer could be problematic.

The filter assembly disclosed herein may be directed to mitigating or overcoming one or more of the possible drawbacks set forth above and/or other problems of the prior art.

SUMMARY

In one aspect, the present disclosure is directed to a seal arrangement for joining a first component to a second component. The seal arrangement may include a first sealing surface formed as an integral portion of the first component, and a second sealing surface formed as an integral portion of the second component and configured to directly engage the first sealing surface. The seal arrangement may also include an energizer engaged with the first sealing surface and configured to inhibit movement of the first sealing surface away from the second sealing surface during a temperature drop.

According to a further aspect, the present disclosure is directed to a filter cartridge. The filter cartridge may include a canister, a filtration medium disposed inside the canister, and a protrusion extending axially from an end of the canister. The protrusion may have a sealing surface formed thereon. The filter cartridge may also include an energizer ring connected to the protrusion at a radial side opposite the sealing surface. The energizer ring may have a coefficient of thermal expansion greater than the protrusion.

According to still a further aspect, the present disclosure is directed to a filter assembly. The filter assembly may include a base having a recess and a first sealing surface formed inside of the recess, a cylindrical canister configured to threadingly engage the recess of the base, and a compression seal disposed between the base and a shoulder of the cylindrical canister. The filter assembly may also include a filtration medium disposed inside the canister, and a protrusion extending axially from an end of the canister into the recess of the base. The protrusion may have a second sealing surface formed thereon that is configured to directly engage the first sealing surface when the cylindrical canister is connected to the base at a first temperature. The filter assembly may also include an energizer ring connected to at least one of the base and the protrusion at a radial side opposite a corresponding one of the first or second sealing surfaces. The energizer ring may have a coefficient of thermal expansion greater than a coefficient of thermal expansion of the at least one of the base and the protrusion and be configured to inhibit the first and second sealing surfaces from moving away from each other when exposed to a second temperature colder than the first temperature.

BRIEF DESCRIPTION OF THE DRAWINGS

FIG. 2 is a cross-sectional illustration of another exemplary disclosed filter assembly;

FIG. 3 is a cross-sectional illustration of another exemplary disclosed filter assembly;

FIG. 4 is a cross-sectional illustration of another exemplary disclosed filter assembly.

DETAILED DESCRIPTION

Figure 1:
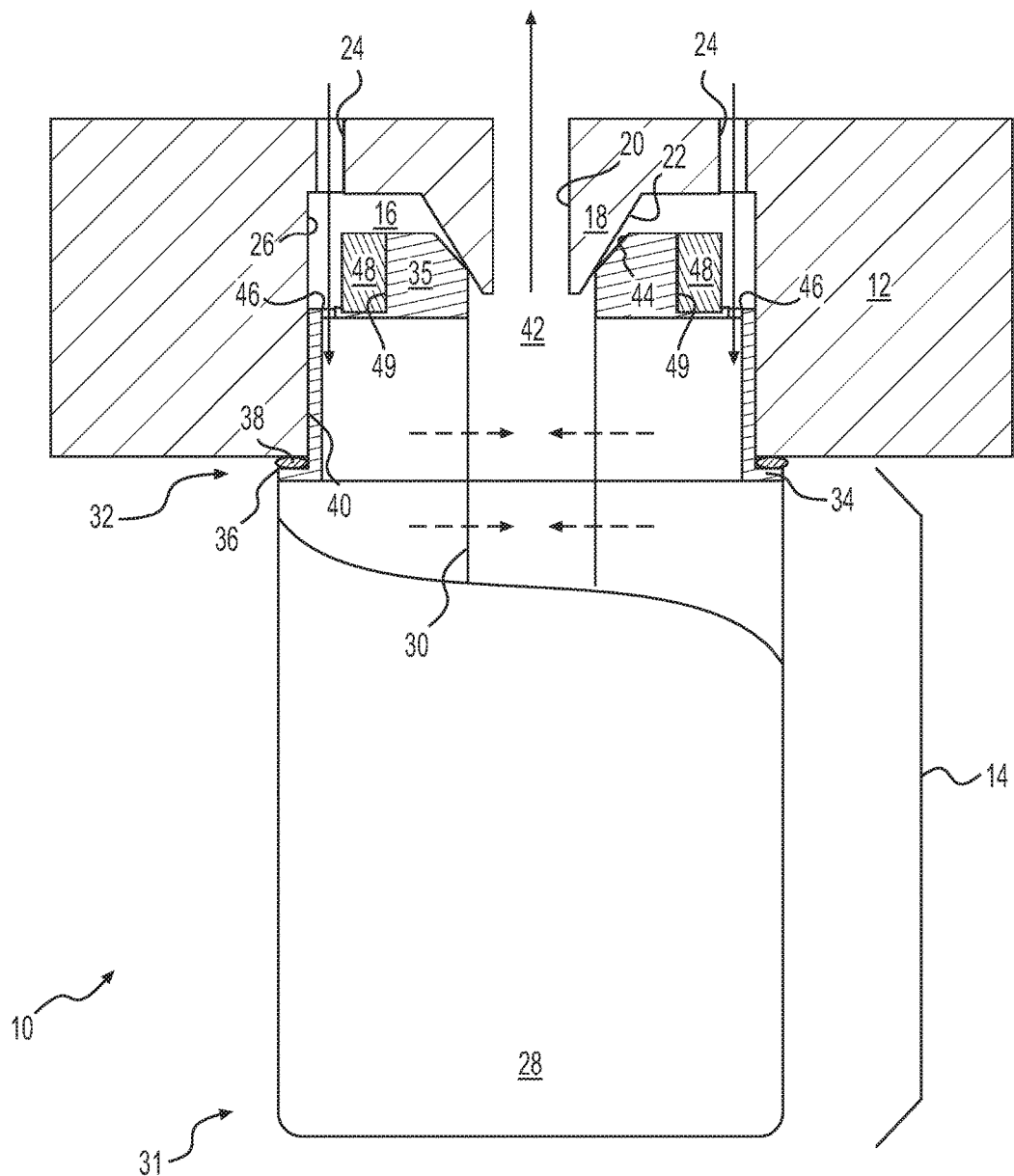
FIG. 1 is a cross-sectional illustration of an exemplary disclosed filter assembly.

FIG. 1 illustrates an exemplary filter assembly 10. Filter assembly 10 may be used to filter debris and/or contaminates (e.g., water) from fluids such as, for example, fuels, lubricants, coolants, and hydraulic oils used by machines. In the embodiment of FIG. 1, filter assembly 10 is a spin-on type of filter assembly configured to filter a cryogenic fuel (e.g., liquefied natural gas—LNG) before the fuel is consumed by an engine (not shown). Filter assembly 10 may include, among other things, a base 12 configured to couple a filter cartridge 14 to a machine (e.g., to the engine and/or to a pump that feeds the engine).

Base 12 may be a monolithic structure that is cast, forged, and/or machined from a corrosion-resistant material (e.g., stainless steel). Base 12 may have a recess 16 formed within a lower (i.e., lower relative to the perspective of FIG. 1) wall. Recess 16 may be configured to receive at least a portion of filter cartridge 14, such that filter cartridge 14 hangs from and is supported by base 12. A protrusion 18 may extend downward through a general center of recess 16 toward filter cartridge 14, and a passage 20 may pass axially through protrusion 18. In the disclosed embodiment, an outer annular surface 22 of protrusion 18 is tapered (e.g., oriented at an oblique angle relative to a flow direction through passage 20) and functions as a high-pressure sealing surface. At least one additional passage 24 may be formed within base 12 and pass axially through an end wall of recess 16 at a radial location between protrusion 18 and an annular wall 26 of recess 16. In the disclosed embodiment, passage(s) 24 function as inlets, funneling unfiltered cryogenic fuel from a tank (not shown) to filter cartridge 14, while passage 20 functions as an outlet directing filtered cryogenic fuel out of filter cartridge 14 to the pump that feeds the associated engine. It is contemplated that the flow directions through passages 20 and 24 could be reversed, if desired. As will be described in more detail below, outer annular surface 22 may be used to create a seal that isolates passage 20 from passage(s) 24.

Filter cartridge 14 may include, among other things, a canister 28, and a filtration medium 30 encapsulated within canister 28. Canister 28 may be cylindrical, hollow, and fabricated through a deep-draw process, a traditional fabrication process (e.g., cutting and welding), or another similar process from a corrosion-resistant material (e.g., from the same stainless steel as base 12). Canister 28 may have a closed lower end 31, and an open upper end 32 through which filtration medium 30 may be installed. Filtration medium 30 may include any medium type known to those skilled in the art such as, for example, foam-type, screen-type, random metal fiber (e.g., metal felt) type, paper-type, and combinations thereof.

A cap 34 may be situated to close off open upper end 32 of canister 28, and a protrusion 35 may extend a distance from cap 34 into recess 16. In one embodiment, cap 34 and canister 28 are bonded to each other, for example via friction welding, laser welding, and/or crimping. A shoulder 36 may be located at open upper end 32 of canister 28 (e.g., at an intersection of canister 28 and cap 34) and function as a seat for a compression seal 38. As will be described in more detail below, when filter cartridge 14 is connected to base 12, compression seal 38 may be sandwiched between shoulder 36 and the lower wall of base 12, thereby inhibiting leakage from recess 16.

Cap 34 may additionally function to connect filter cartridge 14 to base 12. In the disclosed embodiment, cap 34 (including protrusion 35) is fabricated (e.g., cast, stamped, and/or machined) from the same material as canister 28, and includes external threads 40 that engage corresponding threaded features inside of recess 16. With this configuration, a relative rotation between base 12 and filter cartridge 14 may function to pull canister 28 against compression seal 38 and toward base 12 or to push canister 28 away, depending on the rotation direction.

Protrusion 35 may take a variety of different forms. In the embodiment of FIG. 1, a central outlet 42 is formed within an end face of protrusion 35 to fluidly communicate with axial passage 20 of base 12. An inner annular surface 44 may be formed around central outlet 42 and configured to function as a high-pressure sealing surface that engages outer annular surface 22 of protrusion 18. Inner annular surface 44 may be tapered to generally mate against the taper of outer annular surface 22 and thereby create a fluid-tight seal as the two surfaces are pushed together. In the embodiment of FIG. 1, protrusion 18 of base 12 is received within central outlet 42 of protrusion 35, such that inner annular surface 44 radially surrounds outer annular surface 22. The end face of protrusion 35 may be stepped, with a plurality of perforations 46 arranged in a circle around (e.g., radially outward of) inner annular surface 44. Perforations 46 may function as inlets to filter cartridge 14 that are in communication with axial passage(s) 22. The stepped end face of protrusion 35 may provide space (e.g., a radial and axial space) for the fluid of axial passage(s) 24 to be distributed to and enter perforations 46.

An energizer 48 may be situated to exert a radial force directed inward toward inner and outer annular surfaces 44, 22 as a temperature of filter assembly 10 drops. In one embodiment, the radial force exerted by energizer 48 is only enough to inhibit significant separation of inner annular surface 44 from outer annular surface 22 (i.e., to inhibit separation that allows debris particles greater than a threshold size to pass therebetween). In other embodiments, however, the radial force exerted by energizer 48 may be enough to push outer annular surface 44 toward inner annular surface 22, thereby increasing the fluid-tight seal created by the engagement of these surfaces.

Energizer 48 may be generally ring-like and made from a material different from the material of inner and outer annular surfaces 44, 22. For example, energizer 48 may be made from copper, aluminum, zinc, or another material having a relatively higher coefficient of thermal expansion. The coefficient of thermal expansion of energizer 48 may be about 1.1 to about 2.25 times higher than the coefficient of thermal expansion of inner and outer annular surfaces 44, 22. For example, the coefficient of thermal expansion of energizer 48 may be about 16.6 to about 29.7 µm/m-° K, while the coefficient of thermal expansion for inner and outer annular surfaces 44, 22 may be about 9.5 to about 17.3 µm/m-° K. As will be explained in more detail below, this difference in the coefficients of thermal expansion may be what generates the force of energizer 48 described above during a temperature drop within filter assembly 10.

In the embodiment of FIG. 1, energizer 48 annularly surrounds both of inner and outer annular surfaces 44, 22, and is connected to protrusion 35 at a side opposite inner annular surface 44 (e.g., to an outer annular surface 49 of protrusion 35). In one example, energizer 48 is tightly connected to outer annular surface 49 of protrusion 35, for example via welding (e.g., laser or friction welding), brazing, press-fitting, and/or chemical bonding. In another example, energizer 48 is loosely fitted over protrusion 35, and then mechanically inhibited (e.g., by way of a lip or other deformation formed into the end face thereof) from slipping off protrusion 35.

The filter assembly embodiment of FIG. 2 may also be a spin-on type filter assembly that is similar to the embodiment of FIG. 1. In particular, filter assembly 10 of FIG. 2 may include base 12 and filter cartridge 14. In addition, filter cartridge 14 of FIG. 2 may include canister 28 and cap 34, just like the embodiment of FIG. 1. And cap 34 may include protrusion 35, which is configured to internally receive protrusion 18 of base 12. However, in contrast to the embodiment of FIG. 1, inner and outer annular surfaces 44, 22 are not tapered. Instead, inner and outer annular surfaces 44, 22 are generally cylindrical, concentric, and annularly engaged with each other via a radial slip-fit.

The filter assembly embodiment of FIG. 3 may be similar to the embodiment of FIG. 1, but with a reverse sealing relationship between protrusion 35 and base 12. In particular, instead of protrusion 35 internally receiving a corresponding protrusion of base 12, an obliquely oriented inner annular surface 50 of base 12 may be formed inside of recess 16 and configured to internally receive an outer annular surface 52 of protrusion 35. In other words, protrusion 35 of FIG. 3 does not include inner annular surface 44 and base 12 does not include outer annular surface 22. These surfaces have been replaced with outer annular surface 52 and inner annular surface 50, respectively. In addition, energizer 48 is located radially inward of protrusion 35 to generate an outwardly extending radial force that urges outer annular surface 52 of protrusion 35 toward inner annular surface 50 of base 12. In order for energizer 48 to generate the outwardly extending radial force during a temperature drop (i.e., instead of the inwardly extending radial force described above), the coefficient of thermal expansion relationship between energizer 48 and the remaining components of filter assembly 10 may also need to be reversed. In particular, in the embodiment of FIG. 3, the coefficient of thermal expansion of energizer 48 may need to be relatively lower. In this embodiment, energizer 48 may be fabricated from, for example, iron, nickel, or titanium.

The filter assembly embodiment of FIG. 4 may include a combination of features from the filter assembly embodiments of FIGS. 1 and 3. In particular, filter assembly 10 of FIG. 4 may include a protrusion 54 that is similar to protrusion 18 of FIG. 1, but that includes the obliquely oriented inner annular surface 50 of FIG. 3. In like manner, protrusion 35 shown in the embodiment of FIG. 4 may have the same outer annular surface 52 shown in FIG. 3 and protrusion 35 may be internally received within protrusion 54. However, in contrast to the previous embodiments, energizer 48 may exert its radial inward force on protrusion 54 (i.e., instead of on protrusion 35).

Figure 5:
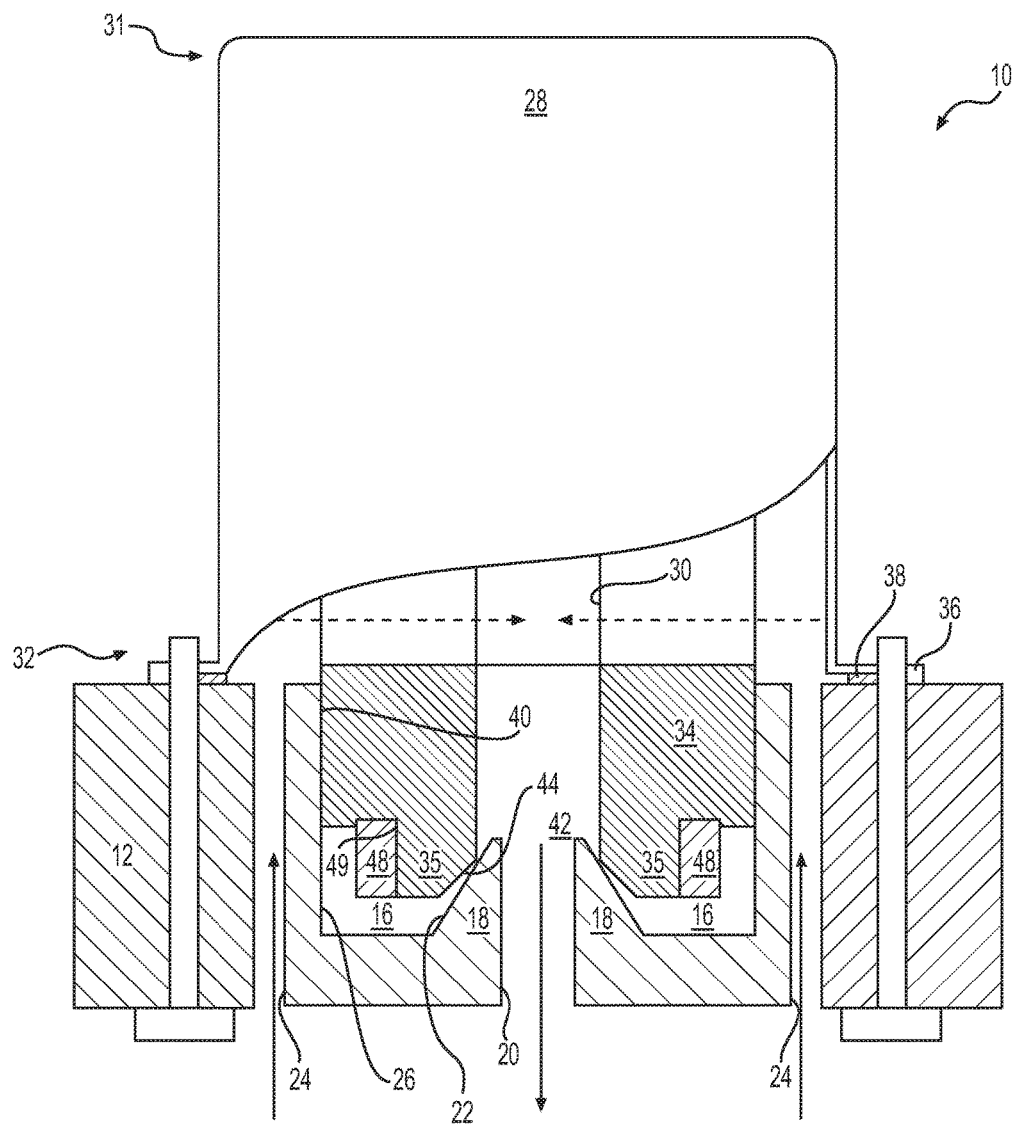
FIG. 5 is a cross-sectional illustration of another exemplary disclosed filter assembly.

The filter assembly embodiment of FIG. 5 may not be a spin-on type of filter assembly, but still includes many of the features from the embodiments of FIGS. 1-4 (particularly FIG. 1). Specifically, filter assembly 10 of FIG. 5 may still include base 12 having recess 16, protrusion 18, passage 20, outer annular surface 22, and passage 24. In addition, filter assembly 10 of FIG. 5 may still include canister 28, filtration medium 30, and cap 34 having protrusion 35 with outlet 42 and inner annular surface 44 that engages outer annular surface 22. However, in contrast to the previously described embodiments, FIG. 5 shows canister 28 being separate from filtration medium 30, and cap 34 being connected to an end of filtration medium 30 (instead of to canister 28). In addition, cap 34 may no longer include perforations 46. In this embodiment, filtration medium 30 and cap 34 are together threaded into engagement with base 12 via threads 40, but canister 28 is separately connectable to base 12 via one or more fasteners 56 that pass through shoulder 36. While the embodiment shown in FIG. 5 may seal in nearly an identical manner to the embodiment shown in FIG. 1, the embodiment of FIG. 5 may support greater flow rates for larger applications. In particular, the separate nature of canister 28 and filtration medium 30 may reduce efforts required to replace these components, as the separated weights may be less. In addition, although any of the embodiments described above may be inverted, FIG. 5 is particularly useful when inverted because the heavier weights of the larger components may not need to be supported during connection to base 12, thereby making assembly easier. That is, canister 28, filtration medium 30, and cap 35 may rest on base 12 during assembly.

INDUSTRIAL APPLICABILITY

The filter assembly of the present disclosure may be useful for filtering fluids for a variety of machines, including pumps and engines. The disclosed filter assembly may include a unique sealing arrangement, which provides fluid-tight sealing through a wide range of temperatures. For example, the disclosed filter assembly may provide fluid-tight sealing at ambient temperatures and also at extremely low temperatures (e.g., at temperatures about −160° C. or lower). It is contemplated that the disclosed sealing arrangement could additionally or alternatively be used to create a fluid-tight seal between non-filter components, if desired.

Referring to FIGS. 1 and 5, filter cartridge 14 may be assembled to base 12 in a removable manner, such that when filtration medium 30 is saturated with debris and/or other contaminates, the existing filter cartridge 14 may be quickly and easily replaced with a new filter cartridge 14. Filter cartridge 14 may be connected to base 12 by inserting cap 34 into recess 16 and engaging threads 40 with the corresponding threaded features inside recess 16. Cap 34 (together with canister 28 and/or filtration medium 30) may then be rotated to advance cap 34 further into base 12.

Eventually, the advancement of cap 34 into base 12 may cause protrusion 18 of base 12 to be received within outlet 42 of protrusion 35. Cap 34 may be advanced into base 12 until inner annular surface 44 engages outer annular surface 22 with sufficient force to create a fluid-tight seal at ambient temperature. A supply of fluid (e.g., LNG) may then be passed through filter assembly 10 via passage(s) (24), filtered by filter cartridge 14, and then directed to the corresponding machine(s) via passage 20. Specifically, the fluid from passage(s) 24 may flow through the internal space of recess 16 and enter filter cartridge 14 (e.g., via perforations 46 in the FIG. 1 embodiment or directly into canister 28 in the FIG. 5 embodiment). The fluid may then pass through filtration medium 30, and then exit filter cartridge 14 via outlet 42 and pass out of base 12 via passage 20.

As fluid passes through filter assembly 10, the fluid may cool the various components of filter assembly 10. For example, when LNG is directed through filter assembly 10, the extremely low temperatures typical of LNG may cause protrusions 18 and 35 to cool. As these components cool, inner annular surface 22 may shrink radially inward, upward, and away (relative to the perspective of FIG. 1) from protrusion 35 at the same time that outer annular surface 44 shrinks downward and away from protrusion 18. If unaccounted for, the shrinking of these surfaces away from each other could allow for a radial gap to form therebetween. The radial gap, if large enough, would allow unfiltered fuel to pass from passage(s) 24 directly to passage 20 (i.e., to bypass filtration medium 30), possibly resulting in damage to the associated machine (e.g., to the engine and/or to the pump that feeds the engine).

Energizer 48 may be located and configured to inhibit protrusions 18 and 35 from moving away from each other. In particular, due to the higher coefficient of thermal expansion of energizer 48, energizer 48 may shrink at a greater rate when exposed to the extremely low temperature of the LNG than either of protrusions 18 or 35. And due to the ring-like shape of energizer 48, shrinking of energizer 48 may cause an inner diameter of energizer 48 to get smaller. Accordingly, when filter assembly 10 is exposed to the dropping temperatures, energizer 48 may shrink radially inward to choke protrusion 35 (i.e., to push radially inward on outer annular surface 49 of protrusion 35). This action may generate the radial force described above, which may function to inhibit outward movement of protrusion 35 or even to deflect protrusion 35 radially inward toward protrusion 18. In other words, energizer 48 may limit or even reduce the size of the radial gap between inner and outer annular surfaces 44, 22 normally caused by the temperature drop. In this way, the fluid-tight seal between inner and outer annular surfaces 44, 22 that is formed at ambient temperature may be maintained, even at extremely low temperatures.

The filter assembly embodiment of FIG. 2 may function in much the same was as described above, with respect to the embodiment of FIG. 1. However, due to the radial slip-fit between the cylindrical surfaces, filter assembly 10 may not actually have a fluid-tight seal at startup of fluid flow through filter assembly 10. That is, a small radial gap may initially exist. However, almost immediately when the cold fluid begins to flow through filter assembly 10, the inward shrinking of energizer 48 may function to close the radial gap and thereby establish the fluid-tight seal.

The filter assembly embodiment of FIG. 3 may function in reverse manner, when compared to the embodiment of FIG. 1. In particular, due to the lower coefficient of thermal expansion of energizer 48 in the embodiment of FIG. 3, energizer 48 may shrink at a lower rate when exposed to the extremely low temperature of the LNG than either of protrusions 18 or 35. And due to the lower shrinking rate of energizer 48, energizer 48 function to limit inward shrinking of protrusion 35 that could create the radial gap. This action may generate the outwardly extending radial force described above, thereby maintaining the fluid-tight seal between inner and outer annular surfaces 50, 52, even at extremely low temperatures.

The filter assembly embodiment of FIG. 4 may function in much the same way as the embodiments of FIGS. 1 and 2. However, instead of energizer 48 functioning to press protrusion 35 toward the corresponding protrusion of base 12, energizer 48 of FIG. 4 may function to press protrusion 54 of base 12 toward protrusion 35. The outcome may be substantially the same, in that the radial gap normally caused by exposure to extremely low temperatures may be limited and/or reduced by the shrinkage of energizer 48.

For the purposes of this disclosure, the mating annular surfaces of base 12 and filter cartridge 14 (i.e., the inner and outer annular surfaces of protrusions 18, 35, and 54), together with energizer 48 may be considered sealing arrangements. And although the sealing arrangements of FIGS. 1-5 are shown in connection with filter assembly 10, it is contemplated that these same or similar sealing arrangements could be applied to other fluid system components to create fluid-tight seals that are maintained during extreme temperature swings, if desired.

It will be apparent to those skilled in the art that various modifications and variations can be made to the disclosed, exemplary filter assemblies. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter cartridge configured to provide cryogenic sealing, comprising:
 a canister;
 a filtration medium disposed inside the canister;
 a protrusion extending axially from an end of at least one of the canister or the filtration medium and having a sealing surface formed thereon, the protrusion forming an end-most portion of the filter cartridge, and the sealing surface is a radially inward facing inner annular surface that is oriented at an oblique angle relative to a central longitudinal axis of the filter cartridge; and
 an energizer ring connected to the protrusion at a radial side opposite the sealing surface so as to surround the protrusion, the energizer ring having a coefficient of thermal expansion greater than the protrusion,
 wherein the energizer ring is disposed around an outer annular surface of the protrusion.

2. The filter cartridge of claim 1, further including:
 threads formed within an outer annular surface of the protrusion;
 a compression seal engaged with a shoulder of the canister;
 an inlet formed radially inward of the compression seal; and
 an outlet formed within an end face of the protrusion.

3. The filter cartridge of claim 1, wherein:
 the protrusion is made from stainless steel; and
 the energizer ring is made from aluminum or zinc.

4. A filter assembly configured to provide a cryogenic seal, comprising:
 a base having a recess and a first sealing surface formed inside of the recess;
 a cylindrical canister configured to engage the base;
 a compression seal disposed between the base and a shoulder of the cylindrical canister;
 a filtration medium disposed inside the cylindrical canister;
 a protrusion extending axially from an end of at least one of the canister or the filtration medium into the recess of the base and having a second sealing surface formed thereon that is configured to directly engage the first sealing surface when the protrusion is connected to the base at a first temperature, the protrusion forming an end-most portion of said at least one of the canister or the filtration medium, and the second sealing surface is a radially inward facing inner annular surface that is oriented at an oblique angle relative to a central longitudinal axis of the filter assembly; and
 an energizer ring connected to the protrusion at a radial side opposite the second sealing surfaces so as to surround the protrusion, the energizer ring having a coefficient of thermal expansion greater than a coefficient of thermal expansion of the the protrusion and being configured to inhibit the first and second sealing surfaces from moving away from each other when exposed to a second temperature colder than the first temperature, thereby providing the cryogenic seal,
wherein the energizer ring is disposed around an outer annular surface of the protrusion.

5. The filter cartridge of claim 1,
wherein an outer annular surface of the energizer ring is offset radially inward relative to an outer annular surface of the canister, and
wherein axial end surface of the protrusion that forms the end-most portion of said at least one of the canister or the filtration medium is flush with an axial end surface of the energizer ring.

\* \* \* \* \*